United States Patent [19]

Junker

[11] Patent Number: 4,926,493

[45] Date of Patent: May 15, 1990

[54] BEARING SYSTEM FOR HIGH SPEED SPINDLES OF MACHINE TOOLS

[76] Inventor: Erwin Junker, Junkerstrasse 1, 7618 Nordach, Fed. Rep. of Germany

[21] Appl. No.: 286,846

[22] Filed: Dec. 20, 1988

[30] Foreign Application Priority Data

Dec. 24, 1987 [DE] Fed. Rep. of Germany ....... 3744040
Dec. 30, 1987 [DE] Fed. Rep. of Germany ....... 3744522

[51] Int. Cl.$^5$ .......................... F16C 19/00; F16C 19/54
[52] U.S. Cl. ...................................... 384/490; 384/549
[58] Field of Search ............... 384/549, 445, 456, 490, 384/494, 548, 556, 558, 563, 565, 603, 627; 57/103, 406; 51/168 TS, 168

[56] References Cited

U.S. PATENT DOCUMENTS

| 1,364,675 | 1/1921 | Almfelt | 51/166 TS |
| 2,828,938 | 4/1958 | Roesch et al. | 384/549 |
| 4,149,365 | 4/1979 | Kobayashi et al. | 57/406 X |
| 4,249,784 | 2/1981 | Ichikawa | 384/548 |

FOREIGN PATENT DOCUMENTS 1009526 5/1957 Fed. Rep. of Germany .
1042302 10/1958 Fed. Rep. of Germany ...... 384/549
29752 9/1964 Fed. Rep. of Germany .

*Primary Examiner*—Thomas R. Hannon
*Attorney, Agent, or Firm*—Antonelli, Terry, Stout & Kraus

[57] ABSTRACT

A bearing system for high speed spindles of machine tools, particularly grinding machines, comprises at least one front bearing arranged close to the spindle flange and a rear bearing, which in each case have three support rolls acting equiangularly on the spidle and having a larger diameter than the latter. In order to obtain a clearance-free bearing system in the case of speeds up to 150,000 rpm satisfying the precision requirements made on precison machine tools, the support rolls are fixed and mounted with roll journals provided on either side in small diameter precision ballbearings in the casing receiving the spindle and the support rolls. The spindle has as bearing surfaces conical portions inclined against one another and with resepct to which the axis of the support rolls is parallel. At least the support rolls of one bearing are adjustable axially parallel to the spindle for prestressing or pretensioning purposes.

12 Claims, 2 Drawing Sheets

BEARING SYSTEM FOR HIGH SPEED SPINDLES OF MACHINE TOOLS

BACKGROUND OF THE INVENTION

The present invention relates to a bearing system and, more particulary, to a bearing system for high speed spindles of grinding machines wherein at least one front bearing located close to flange of the spindle and a rear bearing are each provided with at least three support rolls acting equal angularly on the high speed spindle, and wherein the at least three support rolls having a diameter larger than a diameter of the spindle.

High demands as regards the operating speed are made on spindles or driving shafts of modern machine tools such as. In the case of rotating tools, for example grinding wheels, this calls for high speeds on the tool or the spindle driving the same. Thus, with spindles having speeds in excess of 100,000 rpm, conventional antifriction or slide bearings are not practical. Moreover, as a result of the extreme centrifugal forces, it is not possible to obtain the necessary rigidity for precise machining in the bearing system.

Therefore numerous attempts have been made to increase this rigidity by moving away from conventional bearing technology, in that, for example the spindles are received between larger diameter support rolls, which are in turn mounted as planetary rotating rolls in a stationary outer ring or race of the spindle casing. As a result of the larger diameter of the rotating support rolls a speed reduction takes place, so that at least theoretically it is possible to better control the centrifugal forces in the bearing system. However, in practice this attempt has failed, because the extremely high precision demands made on machine tools of this type cannot be satisfied. As a result of the many bearing surfaces in different spatial arrangement, namely spindle/support roll and support roll/outer ring, this bearing system, even in the case of the most precise manufacture and fitting of the bearing parts, necessarily has clearances and is consequently not sufficiently rigid to permit precise machining.

The problem of the present invention is to provide a bearing system which, at speeds up to 150,000 rpm, still has an adequate rigidity to permit precise machining, even at such high speeds.

On the basis of the aforementioned bearing system, this problem is inventively solved in that the support rolls are fixed and are mounted with roller journals provided on either side in small diameter precision bearings in the casing receiving the spindles and the support rolls.

Through the reception of the spindles between larger support rolls, in the invention there is also initially a speed reduction on the support rolls in the ratio of spindle diameter to support roll diameter. This lower speed can be absorbed in relatively problem free manner in small precision ballbearings with for example, a bore diameter of 15 mm, as a result of the fixed arrangement of the support rolls. Due to the fixed arrangement of the support rolls, the bearing system has a high rigidity and the narrow tolerances required within the complete bearing system necessary for the machining accuracy can be achieved.

In order to exclude any clearance, even after prolonged operation, according to a preferred embodiment, the spindle has conical portions as bearing surfaces which are inclined towards one another, and the support rolls are arranged with their axis parallel to the circumferential surface of the conical portions, and at least the support rolls of one bearing are adjustable axially parallel to the spindle.

The above features make it possible to prestress the bearing system, in that the support rolls of at least one bearing are adjustable. The support rolls of at least one bearing can be individually and/or jointly adjustable axially parallel to the spindle.

As a result of the adjustment of individual support rolls and all the support rolls together, the bearings can be prestressed in the axial direction of the spindle such that for example a clearance-free bearing system can be obtained and also maintained during long operating periods.

For the prestressing of individual rolls or for the joint adjustment of all the rolls, it is advantageous to provide a pressure medium, hydraulic or pneumatic, or a spring tension, while a common adjustment of all the support rolls of a bearing can also take place by a servomotor.

The adjustment of individual rolls also offers the possibility of inclining the spindles under clearly defined angles, so that the conicities can be ground with a small cone angle or the grinding wheel can be adjusted with respect to the workpiece and, consequently, a clearance angle can be formed on the tool.

Preferably prestressing exclusively takes place on the support rolls of the rear bearing, which is further from the spindle flange with the tool.

In order to ensure a correct running of the support rolls, the bearing surface thereof is preferably domed, so that at least theoretically there is only a point contact of the support roll on the conical portion of the spindle.

According to a further development of the invention the spindle is driven by means of a HF-motor mounted thereon and the bearings are located on either side of the HF motor. This construction leads to a short, compact bearing system.

BRIEF DESCRIPTION OF THE DRAWINGS

The invention is described in greater detail hereinafter relative to a non-limitative embodiment and the attached drawings, wherein.

DETAILED DESCRIPTION

Figure 1:
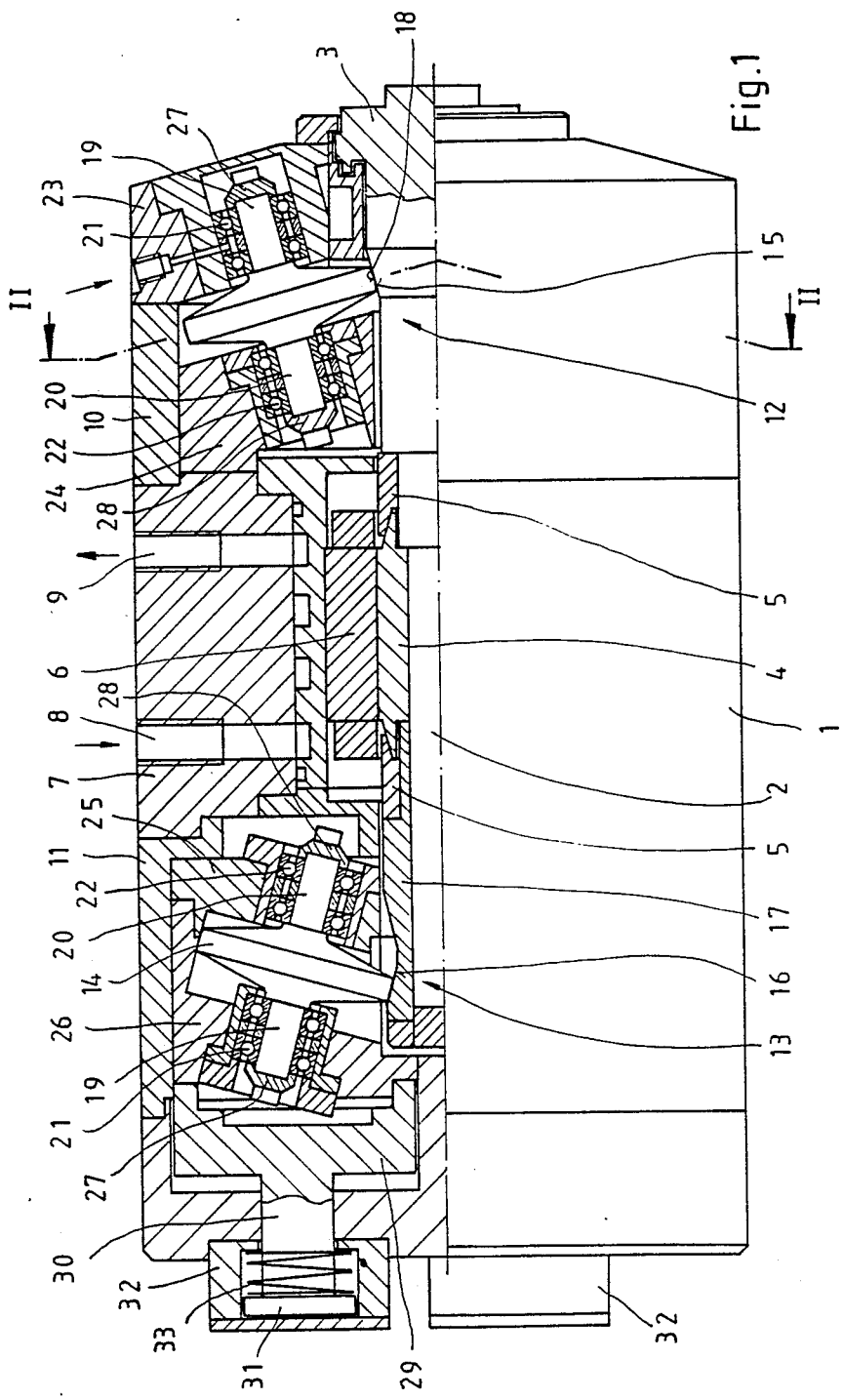
FIG. 1 is a longitudinal cross-sectional view of a spindle and bearing system constructed in accordance with the present invention.

FIG. 1 shows the casing 1 of a spindle 2 having at its front end the spindle flange 3 for receiving a such as, for example a grinding wheel. On the spindle 2 is mounted the rotor 4 of a HF-motor, which is fixed by clamping rings 5 to spindle 2. The stator 6, surrounded by the motor casing 7, is arranged concentrically to the rotor 4 of the HF-motor. Stator 6 and motor casing 7 are supplied with coolant by an inflow 8 and an outflow 9.

Figure 2:
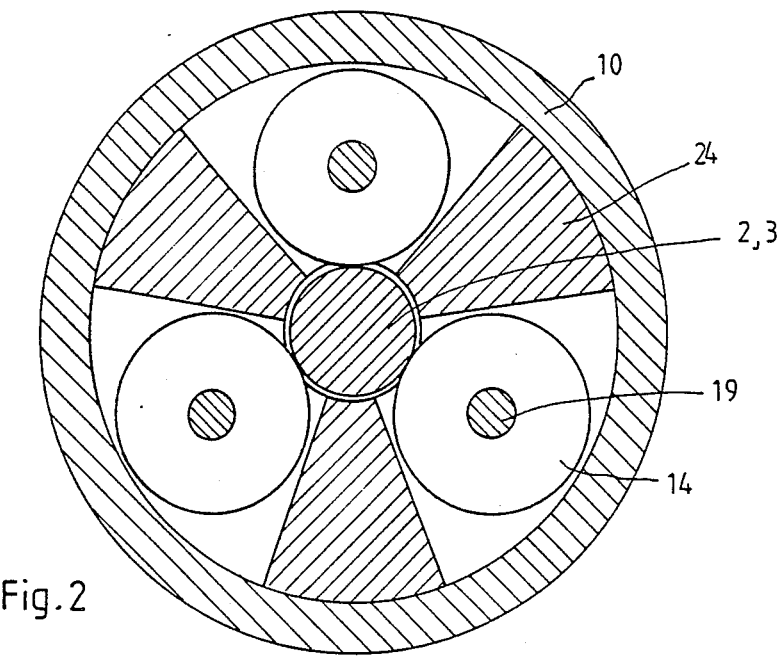
FIG. 2 is a cross-sectional view taken along the line II—II in FIG. 1.

The motor casing 7 is part of the spindle casing 1, which otherwise comprises a front casing part 10 and a rear casing part 11. A bearing generally designated by the reference numeral 12 or 13 is located in each of the casing parts 10, 11 and together they form the bearing system for spindle 2. Each of the bearing 12 and 13 have three support rolls 14, which, as shown most clearly in FIG. 2, are arranged equiangularly on a circumferential circle. In the vicinity of the bearing, the spindle also has in each case one conical portion 15, 16, which form the bearing surfaces of the spindle 2 and on which roll the support rolls 14. Whereas the conical portion 15 of the front bearing is part of spindle 2, the conical portion 16 on the rear bearing 13 is constructed on a bearing bush 17 located on the spindle 2 and, for this purpose, has a constriction.

Figure 3:
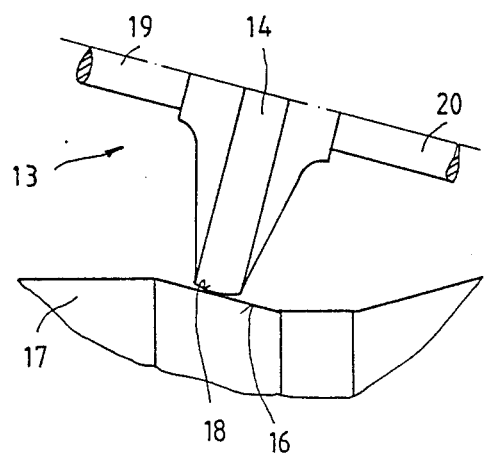
FIG. 3 is a detail view on an enlarged scale, of a support roll for the bearing system of FIG. 1.

The support rolls 14 of the front and rear bearings 12, 13 are constructed in domed manner on their bearing surface 18, as shown most clearly FIG. 3, so that they roll substantially linearly on the conical portions 15, 16.

The support rolls 14 are mounted in small diameter precision inclined ball-bearings 21, 22 by journals 19, 20 arranged on either side and the ball-bearings 21, 22 are, in turn, located in bearing boxes 23, 24 (front bearing) or 25, 26 (rear bearing). The in each case outer precision inclined ballbearings 21 are constructed as loose bearings, while the inner ballbearings 22 are constructed as fixed bearings. In addition, all the precision inclined ballbearings 21, 22 can be prestressed with, in each case, one cover 27, 28, so as to mount in clearance-free manner the support rolls 14.

As shown in FIG. 2, the support rolls 14 have a much larger diameter than the spindle bearing surfaces cooperating therewith, so that the support rolls 14 rotate with a correspondingly reduced speed. As shown in FIG. 1 the conical portions 15, 16 are inclined against one another by the same angle. The support rolls 14 are oriented with their axis parallel to the conical portion, so that the orbital plane of the support rolls 14 is perpendicular to the conical portions 15, 16.

In order to be able to prestress bearings 12, 13, at least the support rolls 14 of rear bearing 13 are adjustable axially parallel to spindle 2. For this purpose the bearing boxes 25, 26 are located on a control piston 29, which is guided in the rear casing 11 and by means of a piston rod 30 and a collar 31 in an outer cylinder 32. Piston 29 is forced outwards by a spring 33 housed in cylinder 32 in the sense of a pretensioning of support rolls 14. Instead of this a pressure medium action is also possible. Moreover, a servomotor acting on all three pistons 29 can be provided for the uniform adjustment of all the support rolls. The inventive bearing system construction enables high speeds to be obtained on bearing rolls with conventional spindle bearings (precision inclined ballbearings) and conventional oil mist lubrication.

I claim:

1. A bearing system for a high speed spindle of machine tools, the bearing system comprising at least one front bearing means positioned near a flange means of the spindle, a rear bearing means, each of said front bearing means and rear bearing means including at least three support roll means equal angularly disposed with respect to the spindle and acting thereon, each of said support roll means having a diameter larger than a diameter of the spindle, and roll journal means for fixedly mounting said support roll means, said roll journal means being provided on either side in small diameter precision bearing means in a casing means for receiving the spindle and the support roll means, wherein the spindle includes conical bearing surface portions inclined against one another, said support roll means are arranged such that a rotational axis thereof is parallel to a circumferential surface of the conical bearing surface portions, and wherein at least the support roll means of at least one of the front bearing means and the rear bearing means are adjustable axially parallel to the spindle.

2. A bearing system according to claim 1, wherein the support roll means are at least one of individually and jointly adjustable axially parallel to the spindle.

3. A bearing system according to one of claims 1 or 2, wherein each individual support roll means is adjustable by one of a pressure medium and a spring tension.

4. A bearing system according to one of claims 1 or 2, wherein the support roll means are jointly adjustable by servomotor means.

5. A bearing system according to one of claims 1 or 2, wherein only the support roll means of the rear bearing means are adjustable.

6. A bearing system according to one of claims 1 or 2, wherein each of the support roll means have a crowned bearing surface means.

7. A bearing system according to one of claims 1 or 2, wherein HF-motor means are provided for driving the spindle, and wherein the front bearing means and rear bearing means are arranged on either side of the HF-motor means.

8. A bearing system for high speed spindles of machine tools, the bearing system comprising at least one front bearing means positioned near a flange means of the spindle, a rear bearing means, each of said front bearing means and rear bearing means including at least three support roll means equal angularly disposed with respect to the spindle, each of the support roll means having a larger diameter than a diameter of the spindle, roll journal means for fixedly mounting said support roll means, said roll journal means being provided on either side in small diameter precision bearing means in a casing means for receiving the spindle and the support roll means, and wherein the support roll means of at least one of the front bearing means and the rear bearing means are at least one of individually and jointly adjustable axially parallel to the spindle.

9. A bearing system according to claim 8, wherein each individual support roll means is adjustable by one of a pressure medium and a spring tension.

10. A bearing system according to claim 8, wherein the support roll means are jointly adjustable by servomotor means.

11. A bearing system according to claim 8, wherein only the support roll means of the rear bearing means are adjustable.

12. A bearing system according to claim 8, wherein each of the support roll means have a crowned bearing surface means.

* * * * *